United States Patent [19]

Ahad et al.

[11] 4,391,420

[45] Jul. 5, 1983

[54] EMERGENCY LOCKING MEANS FOR DUAL SPOOL SAFETY BELT RETRACTOR

[75] Inventors: Munir J. Ahad, Newhall; William Hollowell, Pacific Palisades; Akira Tanaka, Northridge; Avraham Ziv, Sepulveda, all of Calif.

[73] Assignee: American Safety Equipment Corporation, San Fernando, Calif.

[21] Appl. No.: 241,531

[22] Filed: Mar. 9, 1981

[51] Int. Cl.³ ................ A62B 35/02; B65H 75/48
[52] U.S. Cl. ............................ 242/107.4 A
[58] Field of Search ............. 242/107.4 R–107.4 E; 280/806; 297/478, 480

[56] References Cited

U.S. PATENT DOCUMENTS

| | | |
|---|---|---|
| 987,272 | 3/1911 | Valiquet . |
| 2,495,990 | 6/1948 | Sockell . |
| 2,930,540 | 3/1960 | Obolensky . |
| 3,220,663 | 11/1965 | Martin ............... 242/107.4 A |
| 3,259,331 | 7/1966 | Liddle . |
| 3,834,646 | 9/1974 | Heath ............... 242/107.4 A X |
| 3,960,339 | 6/1976 | Fisher ............... 242/107.4 R |
| 3,974,979 | 8/1976 | Fieni ............... 242/107.4 R |
| 4,040,576 | 8/1977 | Walker et al. ...... 242/107.4 A |
| 4,065,070 | 12/1977 | Pilarski et al. ..... 242/107.4 A |
| 4,127,181 | 11/1978 | Arndt et al. . |
| 4,135,683 | 1/1979 | Stephenson et al. ... 242/107.4 A |
| 4,147,387 | 4/1979 | Coenan ............... 242/107 |
| 4,164,336 | 8/1979 | Higbee et al. ...... 242/107.4 A |
| 4,241,886 | 12/1980 | Maekawa et al. ... 242/107.4 A X |
| 4,245,798 | 1/1981 | Steger ............... 242/107.4 A |
| 4,277,037 | 7/1981 | Loose et al. ........ 242/107.4 A |

Primary Examiner—John M. Jillions
Attorney, Agent, or Firm—Poms, Smith, Lande & Rose

[57] ABSTRACT

A dual spool safety belt retractor having first and second ratchet means on first and second spools, respectively, is provided with an improved dual locking pawl emergency locking means including an action pawl for engaging only the ratchet wheel means of the first spool in response to actuation by inertia sensing means and reaction pawl means separate from the action pawl means for reacting in response to movement of the action pawl on its engagement with the first spool to cause locking of the second spool by the separate reaction pawl. Resilient connecting means are illustrated between the action and reaction pawl means for resiliently urging the reaction pawl into locking engagement with the ratchet wheel of the second spool in a continuing manner to overcome false locking conditions, exemplary embodiments of the resilient connecting means including a flexible linkage, a resilient rubber-like body, a leaf spring, a coil spring and a right angle leaf spring. Pawl programming means are also provided including at least a program ratchet on the first spool and a program pawl connected to the action pawl to program lockup of the action pawl to the first spool with an exemplary embodiment having a similar pawl programming means associated with the second spool and reaction pawl with a flexible linkage connecting the two program pawls.

15 Claims, 19 Drawing Figures

EMERGENCY LOCKING MEANS FOR DUAL SPOOL SAFETY BELT RETRACTOR

BACKGROUND OF THE INVENTION

The present invention relates in general to emergency locking means for dual spool safety belt retractors employed in vehicles for restraining passengers in their seats during emergency conditions and more particularly to an improved dual locking pawl emergency locking means for such a retractor employing a single vehicle inertia sensor for operating the locking means.

Dual spool automatic locking safety belt retractors have been developed heretofore for use in automotive vehicles to automatically lock a pair of safety belts wound about the dual spools in an emergency condition encountered by the vehicle. In some instances the retractor is mounted between the vehicle seats with the seat belts serving two separate safety belt systems for the two front seat passengers. In other situations, the retractor may be used for storing two ends of safety belt webbing employed in a single harness arrangement for a single passenger to be restrained in the vehicle seat in the case of an emergency condition. It is common to sense such emergency conditions through the use of vehicle inertia sensors of known construction which react in response to vehicle acceleration or deceleration of more than a predetermined amount to activate locking means employed with the retractor.

Exemplary of prior art dual spool automatic locking retractors are U.S. Pat. Nos. 3,960,339; 3,974,979; 4,065,070; 4,135,683; and 4,164,336. In these prior art patents, a single pawl is provided between two spools of the retractor with the lockup of one end of the pawl with one spool causing the pawl to be moved into locking engagement with the other spool. The single pawls employed have been provided with a "floating" support as in U.S. Pat. No. 4,135,683 or a resilient mounting as in U.S. Pat. No. 3,960,339 in order to improve the locking characteristics of the single pawl employed between two spools.

Where a single double ended pawl is employed, as in the aforementioned prior art patents, there is the possibility that the pawl may experience a false latching condition if the pawl tooth ends, of either end, engage the tip of a tooth on the associated spool locking ratchet normally employed in locking retractor spools. We have therefore determined that there is a need for an improvement in the locking characteristics for an emergency locking means for a dual spool retractor employing a single inertia sensor for operation of the associated pawl means employed for locking the two spools.

SUMMARY OF THE INVENTION

It is the primary object of the present invention to disclose and provide an improved emergency locking means for a dual spool safety belt retractor wherein the lockup characteristics of the locking means are improved in such a manner as to reduce the possibility of a false locking between the pawl and ratchet means of the safety belt retractor.

It is another object of the present invention to provide an improved emergency locking means as in the foregoing object wherein the dual spool ratchets are individually locked by individual ones of a pair of locking pawls in a manner wherein lockup of each pawl with each of the spool ratchets is assured.

It is a still further object of the present invention to disclose and provide an improvement in emergency locking means for a dual spool safety belt retractor as in the foregoing objects wherein the first pawl of a dual pawl arrangement is assured a lockup with a first spool of the retractor in response to changes in vehicle inertia indicative of an emergency condition encounted by the vehicle and that a second pawl operates in reaction to the lockup of the first pawl in a positive and lockup assured manner to engage and lock the second spool in a manner that will overcome any tendencies for the first or second pawls to experience a false locking condition with the respective spools.

Generally stated, the present invention includes the provision of action and reaction pawl emergency locking means for a dual spool safety belt retractor wherein an action pawl means is provided for engaging the first ratchet wheel of the first spool, an inertia sensing means is provided for moving the action pawl into engagement with the ratchet wheel of the first spool and a reaction pawl means separate from the action pawl and so provided as to react in response to movement of the action pawl during the latter's lockup with the first spool so as to cause a lockup of the reaction pawl and the second spool. More specifically, the present invention includes the provision of pawl programming means including at least a program ratchet on the first spool and a program pawl connected to the first action pawl means for programming lockup between the action pawl and the first spool, and in an alternative embodiment, a second program ratchet on the second spool and a second program pawl connected to the reaction pawl means for programming lockup of the second spool.

In addition, as a further aspect of the present invention, resilient connecting means are interposed between the action pawl means and the reaction pawl means for resiliently urging the reaction pawl means into engagement with the ratchet wheel of the second spool in response to lockup of the action pawl with the first spool and in a continuing manner capable of overcoming a false locking condition between the reaction pawl and the second spool ratchet wheel. Exemplary embodiments of such resilient connecting means include the provision of a flexible linkage between the action and reaction pawl means, or their associated program pawls, one or more bodies of resilient energy storing rubber like material molded between the action and reaction pawl means and spring means connected between the pawls including coil springs, leaf springs, and right angle leaf springs depending upon the location of the respective pawls whereby a lockup movement of the action pawl is transmitted through such resilient connecting means to bias in a continuing manner the reaction pawl into lockup engagement with the second spool ratchet wheels.

It is believed that a better understanding of the present invention, as well as a recognition of how the present invention achieves the foregoing objects and attains various additional advantages will become apparent to those skilled in the art from a consideration of the following detailed description of a preferred and several alternative exemplary embodiments of the present invention in action and reaction pawl emergency locking means for a dual spool safety belt retractor. During the following detailed descriptions, reference will be made to the appended sheets of the drawings, which will now first be described briefly.

BRIEF DESCRIPTION OF THE DRAWINGS

FIG. 10 is a veiw as in FIG. 3 showing a third alternative exemplary embodiment of dual locking pawl emergency locking means in accordance with the present invention;

FIG. 11 is a view as in FIG. 10 showing the emergency locking means in spool locking condition;

FIG. 12 is a view as in FIG. 3 showing a fourth alternative exemplary embodiment of dual locking pawl emergency locking means in accordance with the present invention;

FIG. 13 is a view as in FIG. 12 showing the emergency locking means in spool locking condition;

FIG. 17 is a front elevational view of a second exemplary embodiment of dual spool safety belt retractor having a sixth alternative exemplary embodiment of dual locking pawl emergency locking means in accordance with the present invention;

FIG. 18 is a side view of the retractor and locking means of FIG. 17 taken therein along the plane VIII—VIII; and FIG. 19 is a detail section view of the retractor and locking means of FIG. 17 taken therein along the plane XIX—XIX.

DETAILED DESCRIPTION OF A PREFERRED EXEMPLARY EMBODIMENT

Figures 1, 2:
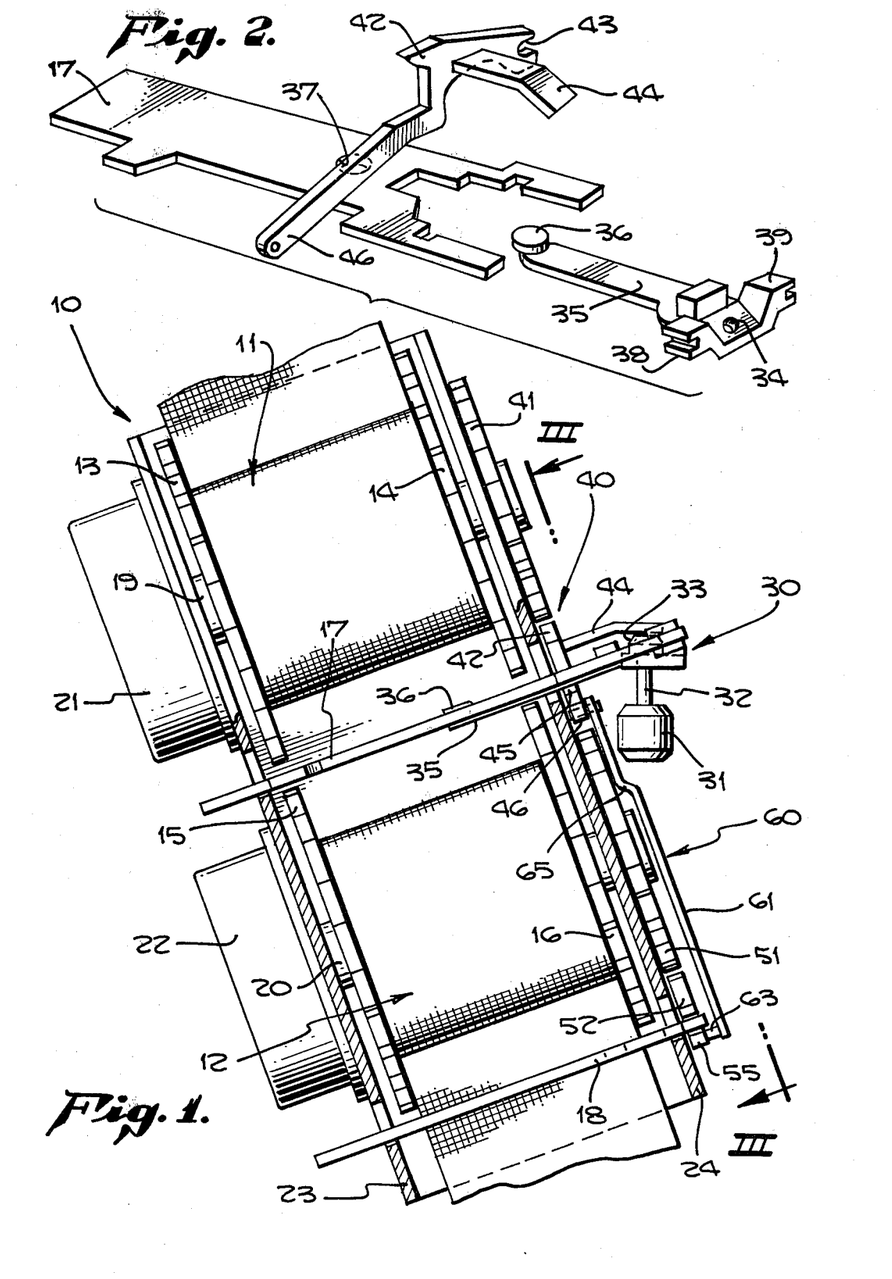
FIG. 1 is a front elevational view of an exemplary dual spool safety belt retractor having a preferred exemplary embodiment of dual locking pawl emergency locking means in accordance with the present invention.
FIG. 2 is an exploded view of a portion of the emergency locking means of the embodiment of FIG. 1.

Referring first to FIGS. 1 through 4, a preferred exemplary embodiment of an improved dual locking pawl emergency locking means in accordance with the present invention will now be described in detail in association with an otherwise conventional dual spool safety belt retractor indicated generally at 10. As is conventional in current state of the art safety belt retractors, a single safety belt retractor may be employed for storing and anchoring a pair of safety belts as illustrated in FIG. 1. An upper spool indicated generally at 11, is provided for storing a first webbing while a lower spool, indicated generally at 12, is provided for storing a second webbing, each of the webbings being locked against protraction by engagement of pawl means discussed hereinafter which engage ratchet means provided on the spools.

Upper spool 11 is provided with locking ratchet wheels 13 and 14 while the lower spool 12 is provided with locking ratchet wheels 15 and 16. As will be discussed more fully hereinafter in association with the detailed explanation of the emergency locking means of the present invention, pawls 17 and 18 are adapted to engage the respective ratchet wheels to prevent spool rotation about spool shafts 19 and 20. Each of the spools is biased toward a webbing stored condition by conventional retraction springs provided within housings 21 and 22 secured to the retractor frame including side walls 23 and 24.

Figure 3:
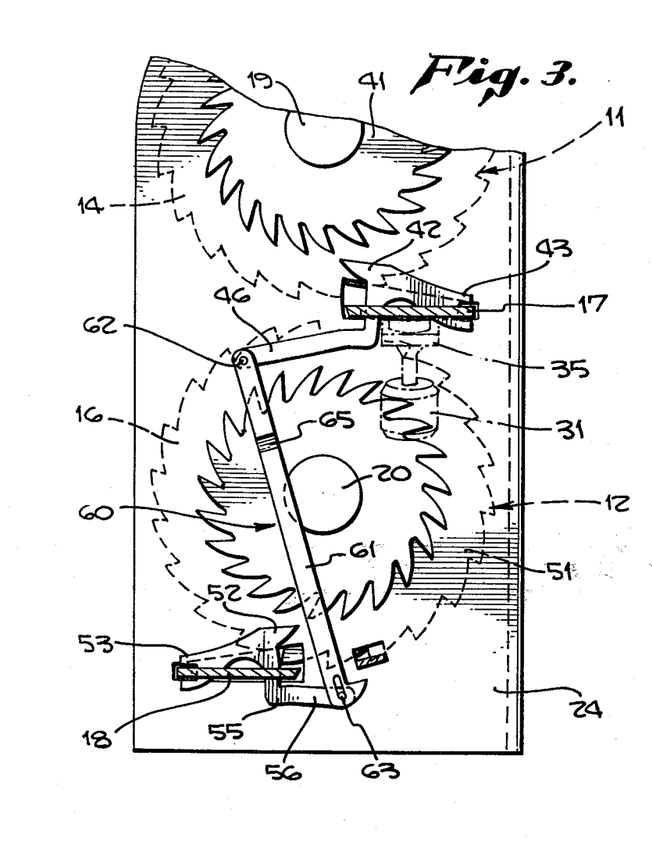
FIG. 3 is a side view of the exemplary dual spool safety belt retractor and dual locking pawl emergency locking means of FIG. 1 taken therein along the plane III—III.

As is contemplated within the present invention, the action pawl 17 engages only the first spool 11 of the dual spool retractor and is operated to a spool locking condition in response to action of a vehicle inertia sensor. In the exemplary embodiment, such vehicle inertia sensor is illustrated generally at 30 and includes a mass 31 suspended by stem 32 from head 33, stem 32 extending through aperture 34 of support 35 from which the head is supported. Support 35 has a locating boss 36 which fits in locating aperture 37 of action pawl 17 with the support further having slotted flanges 38 and 39 to facilitate assembly of support 35 to pawl 17. As is also contemplated within the present invention, pawl programming means are provided in order to program the engagement of action pawl 17 with ratchet wheels 13 and 14 in predetermined manner in response to actuation of the vehicle inertia sensor. In the present exemplary embodiment, such pawl programming means is indicated generally at 40 and includes a program ratchet, which may be made of plastic material, provided on spool shaft 19. A program pawl 42, which also may be made of plastic, is connected to, and in the exemplary embodiment, mounted upon the action pawl 17. As best seen in FIGS. 2 and 3, program pawl 42 is pivoted at its bifurcate end 43 in a recess portion on pawl 17 with an actuating tab 44 overlying the head 33 of the sensor. A foot portion 45 of pawl 42 underlies action pawl 17 such that when sensor mass 31 experiences a vehicle acceleration or deceleration condition of more than a predetermined amount, mass 31 will swing about its pivot on support 35 to cause head 33 to move the tab 44 in an upper direction in FIGS. 1 through 4 to bring the program pawl 42 into engagement with the program ratchet 41 which revolves in response to protraction of webbing on spool 11. Such spool rotation will move the program pawl 42 from the position of FIG. 3 to that of FIG. 4 carrying action pawl 17 into engagement with the first spool ratchet wheels 13 and 14 in a predetermined manner to thereafter prevent spool rotation.

As is particularly contemplated within the present invention, a reaction pawl means is provided in accordance with the present invention to separately engage the second spool ratchet wheels in reaction to movement of the action pawl into locking engagement with the first spool as described hereinbefore. In the present exemplary embodiment, such reaction pawl means includes the provision of reaction pawl 18 which is adapted by means discussed hereinafter to lock spool 12 in response to the locking action of action pawl 17 with spool 11. In the present embodiment, reaction pawl 18 is provided with pawl programming means including program ratchet 51 on spool shaft 20 and program pawl 52 connected to, and in the embodiment mounted upon, pawl 18. Program pawl 52 is pivoted by its bifurcate end 53 upon a notch formed in pawl 18, in the same manner as pawl 42 is mounted to pawl 17 in FIG. 2, with a foot portion 55 underlying portions of reaction pawl 18 as seen in FIG. 3.

As is also contemplated within the present invention, resilient connecting means are provided between the action pawl 17 and the reaction pawl 18, such means being indicated generally at 60 in the present exemplary embodiment. The present exemplary embodiment of resilient connection means includes a linkage comprising link arms 46 and 56, formed integrally of program pawls 42 and 52, respectively, together with an interconnecting flexible link 61. Flexible link 61 is pivotally connected at pivot 62 to link arm 46 and is connected in a pivoted-lost motion connection by a pin and slot connection 63 with arm 56. Flexibility may be provided in link 61, as illustrated, by providing an offset 65 formed integrally of the arm 61.

Figure 4:
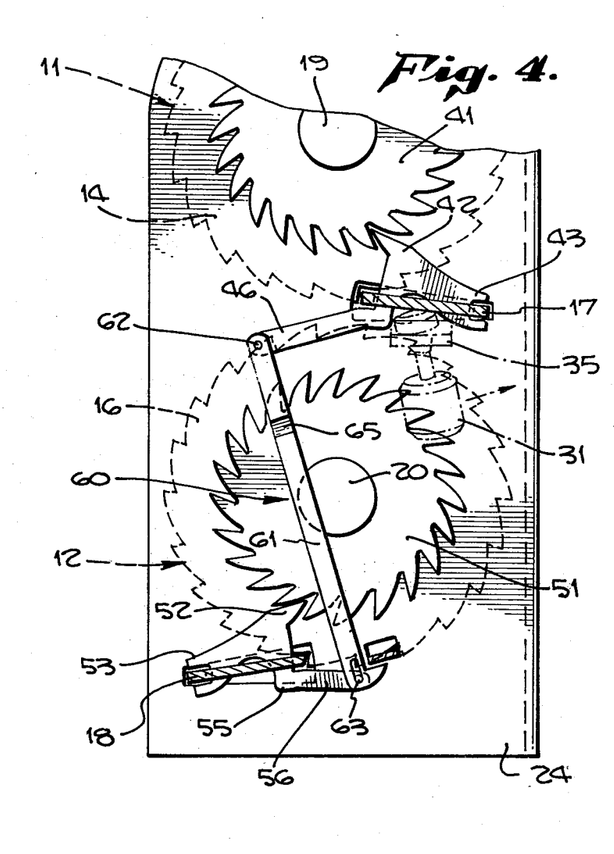
FIG. 4 is a view as in FIG. 3 showing the exemplary emergency locking means in spool locking condition.

As can be seen from the foregoing, when a vehicle employing the exemplary dual spool safety belt retractor of the present embodiment experiences an emergency condition, vehicle inertia sensor means indicated generally at 30 will cause the program pawl 42 to engage program ratchet 41 to move the action pawl 17 into spool locking condition in a predetermined manner in response to slight spool rotation before it is locked by pawl 17 against further belt protracting rotation. A positive locking of the second spool, in a manner which avoids a false locking condition as might occur if the tooth end of reaction pawl 18 were to engage a tooth end of the teeth on ratchet wheels 15 or 16 is accomplished. As is now apparent to those skilled in the art, movement of pawl 17 and program pawl 42 from the position of FIG. 3 to the locking position of FIG. 4 is transmitted through the flexible linkage of arms 45, link 61 and arm 55 to move the reaction pawl 18 and its program pawl 52 into engagement with the programming ratchet 51 and spool locking ratchet wheels 15 and 16. Any tendency for a false latching between the program pawl 52 and program ratchet 51 will be overcome by the resiliency of the linkage, particularly flexible link 61, which will continue to urge pawl 52 into engagement with ratchet 51 and thereby accomplish a programmed lockup of reaction pawl 18 with spool ratchets 15 and 16.

FIRST ALTERNATIVE EXEMPLARY EMBODIMENT

Figure 5:
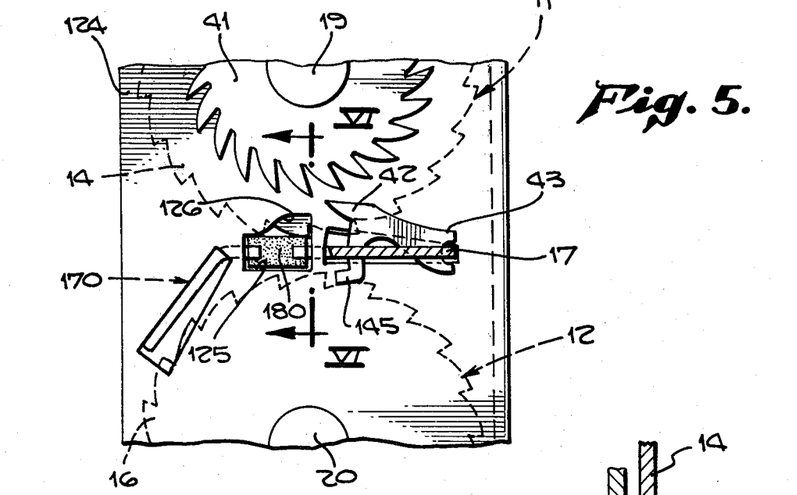
FIG. 5 is a view as in FIG. 3 showing a first alternative exemplary embodiment of dual locking pawl emergency locking means in accordance with the present invention.
Figures 6, 7:
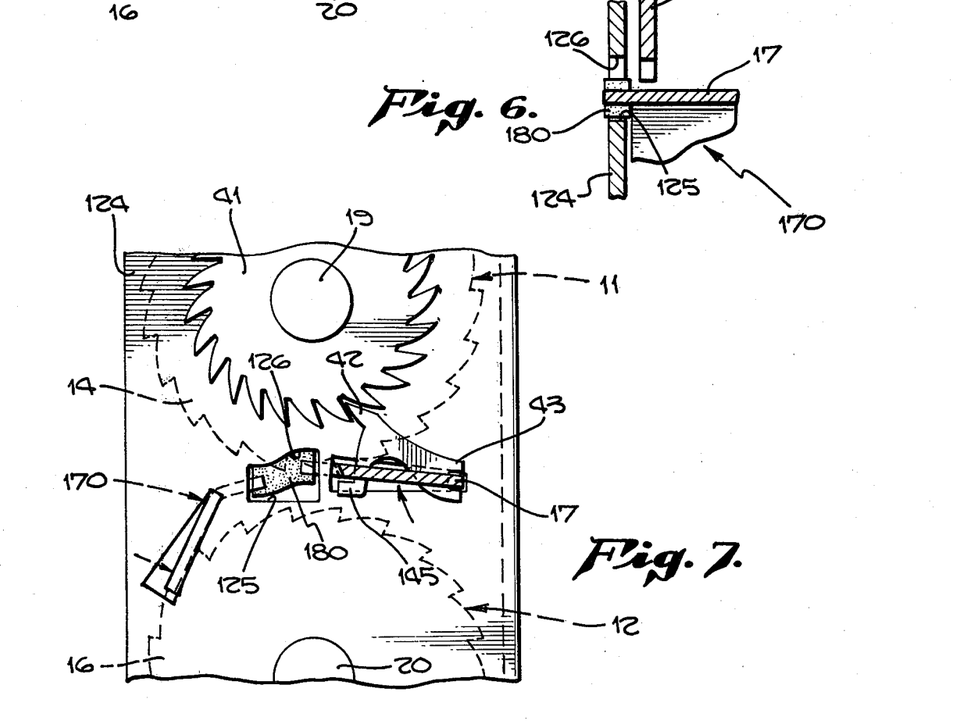
FIG. 6 is a detail section view of the locking means of FIG. 5.
FIG. 7 is a view as in FIG. 5 showing the exemplary emergency locking means in spool locking condition.

Referring to FIGS. 5 through 7, a first alternative exemplary embodiment of dual locking pawl emergency locking means is illustrated in association with the exemplary dual spool safety belt retractor of FIGS. 1 through 4, the retractor being indicated generally at 10 with the same parts of the retractor illustrated in FIGS. 5 through 7 having the same reference numerals as the retractor parts heretofore described with regard to FIGS. 1 through 4. In this first alternative exemplary embodiment of dual locking pawl emergency locking means, the action pawl 17 is provided as before with program pawl 42 mounted by its bifurcate end 43 on pawl 17 for engagement with program ratchet 41. Foot portion 145 of pawl 42 underlies action pawl 17 as before, but does not have an extending link arm as before. Further, in this embodiment the reaction pawl, indicated generally at 170 is mounted by one or more resilient bodies as rubber-like block 180 which is molded about adjacent free ends of the action pawl 17 and reaction pawl indicated generally 170, as best seen in FIGS. 5 and 6, where the pawl ends penetrate the frame sidewalls. Each resilient body 180 is adapted by camming surfaces provided in the side walls of the retractor frame to pivot the reaction pawl 170 into engagement with second spool ratchet wheels 15 and 16 in reaction to locking movement of action pawl 17 into engagement with first spool ratchet wheels 13 and 14. A pair of cut-outs are provided in the retractor side walls, as cut-out 125 in side wall 124 (see FIG. 5) with camming surfaces, as surface 126 in wall 124. When action pawl 17 is in a rest position as seen in FIG. 5, each resilient body 180 sits down upon the associated flat lower surface of the respective side wall cutouts, as cut-out 125, to maintain reaction pawl 170 out of engagement with second spool ratchet wheel 16. However, when the action pawl 17 is moved into locking engagement with spool ratchet wheel 14, the upward movement of its ratchet wheel engaging end moves each rubber-like resilient body 180, in each side wall aperture, spaced outwardly of where pawl 17 engages the ratchet wheels 13 and 14, to the position of FIG. 7, each body 180 conforming to the configuration imposed by the respective cam surfaces 126 to thereby resiliently pivot and urge reaction pawl 170 into engagement with the lower spool ratchet wheels 15 and 16.

SECOND ALTERNATIVE EXEMPLARY EMBODIMENT

Figure 8:
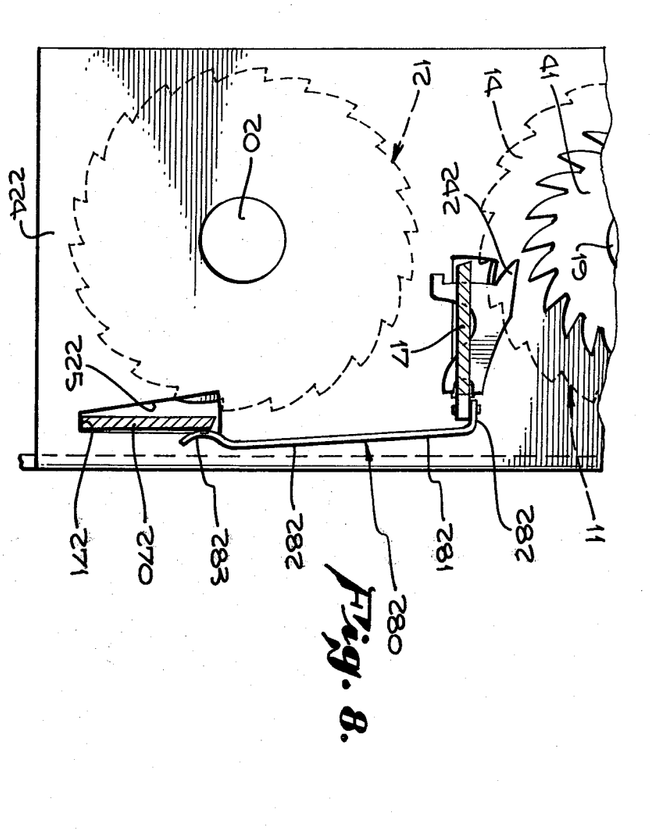
FIG. 8 is a view as in FIG. 3 showing a second alternative exemplary embodiment of dual locking pawl emergency locking means in accordance with the present invention.
Figure 9:
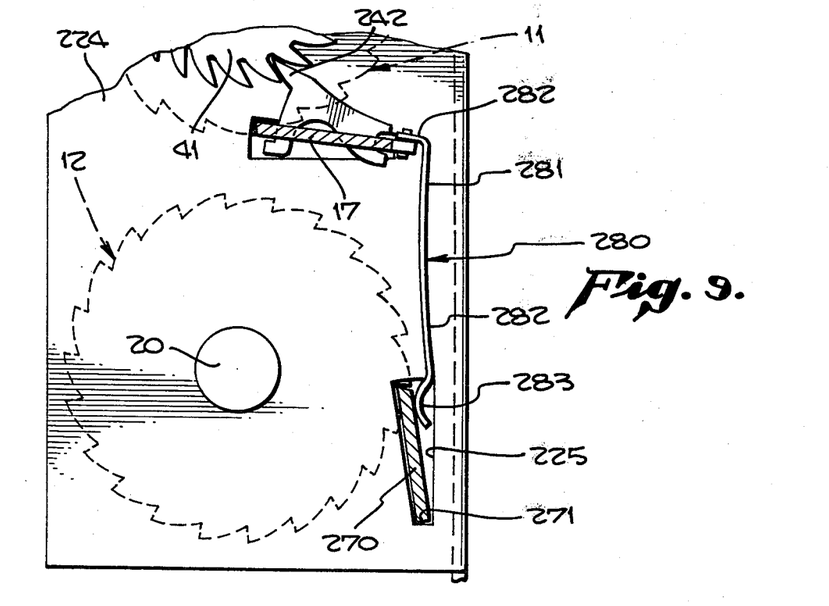
FIG. 9 is a view as in FIG. 8 showing an exemplary emergency locking means in spool locking condition.

Referring now to FIGS. 8 and 9, a second alternative exemplary embodiment of dual locking pawl emergency locking means in accordance with the present invention will be explained. The retractor parts in the present embodiment which are the same as those discussed with regard to the embodiment of FIGS. 1 through 4 are given the same reference numerals as before. As discussed with regard to the first alternative exemplary embodiment, the action pawl 17 in the present embodiment is provided with a program pawl 242 adapted to engage program ratchet 41 in response to operation of an inertia sensor, as the sensor indicated generally at 30 in FIG. 1. In this embodiment, the reaction pawl 270 is pivotally mounted in side wall cut-outs in the retractor frame side walls, as cut-out 225 in side wall 224 to move from the spool free wheeling position of FIG. 8 to the spool ratchet engaging and locking position of FIG. 9. In the present embodiment, the reaction pawl 270 is moved into the spool ratchet engaging and spool locking condition of FIG. 9 through the provision of a resilient connecting means indicated generally at 280. Such connecting means in this embodiment comprises the provision of a leaf spring 281 which is riveted or otherwise fastened at upper end 282 to pawl 17 with a depending extending leaf portion 282 terminating in an end abutment portion 283 lying against the free end of reaction pawl 270.

On pivotal movement of action pawl 17 from the disengaging position of FIG. 8 to the spool locking condition of FIG. 9, a response to operation of the inertia sensor discussed hereinbefore, the resilient interconnecting means indicated generally at 280 will apply a biasing force against the upper free end of reaction pawl 270 which is adapted to pivot about its lower end 271 at outer extremities thereof that fit within the side wall cut-outs, as cut-out 225. The resilient interconnecting means will urge reaction pawl 270 into engagement with second spool ratchet wheels 15 and 16 in a continuing manner such as to overcome any false locking which might occur if a tooth of pawl 271 were to abut a tooth of the ratchet wheels 15 and 16.

THIRD ALTERNATIVE EXEMPLARY EMBODIMENT

Referring now to FIGS. 10 and 11, a third alternative exemplary embodiment of dual locking pawl emergency locking means in accordance with the present invention is illustrated. Retractor parts which are the same in this embodiment as those in the embodiment of FIGS. 1 through 4 are given the same reference numerals. In this embodiment, as discussed before, the action pawl 317 illustrated is provided with a program pawl 42 adapted to be engaged with program ratchet 41 in response to operation of the vehicle inertia sensor indicated generally at 30. Such operation of retraction pawl 317, causing locking of spool 11, will operate in this embodiment upon the resilient connection means indicated generally at 380 to move reaction pawl 370 into engagement with ratchet wheels 15 and 16 of lower spool 12. Reaction pawl 370 is mounted at its outer ends in cut-outs provided in the retractor side walls, as cut out 325 in side wall 324 in FIG. 10. The cut-outs are of general wedge configuration to allow movement of reaction pawl 370, about a lower pivoting end 371, between the free spooling position of FIG. 10 to the spool locking position of FIG. 11 under action of the resilient connection means indicated generally at 380. In the present exemplary embodiment, such connection means comprises the provision of a coil spring 381 having an upper end 382 secured to pawl 317, as by having the spring end fitted through an aperture in pawl 317 and simply hooked over the free of the pawl. Similarly, a lower end 383 of the coil spring may be passed through an aperture provided in the reaction pawl 370 adjacent its free end with an end portion of the spring bent over or otherwise fastened, as by spot welding or the like to pawl 370. The resilient, energy storing capacity of coil spring 381 will assure a continued resilient biasing force upon pawl 370 to cause it to overcome any false locking conditions as may occur to assure lockup of reaction pawl 370 with the ratchet wheels 15 and 16 of lower spool 12 in response to the programmed lockup of action pawl 317.

FOURTH ALTERNATIVE EXEMPLARY EMBODIMENT

Referring to FIGS. 12 and 13, a fourth alternative exemplary embodiment of dual locking pawl emergency locking means, according to the present invention, is illustrated. The retractor parts in this embodiment which are the same as those in the embodiment of FIGS. 1 through 4 are given the same reference numerals as before.

In the present embodiment, as before, the action pawl 17 is adapted by program pawl 42 to be moved into engagement with upper spool ratchet wheels 13 and 14 in programmed manner as pawl 42 engages and is turned by program ratchet 41 from the unlocking position of FIG. 12 to the spool locking position of FIG. 13. In this embodiment, action pawl 17, however, is adapted to slide horizontally in retractor side walls from the position of FIG. 12 to that of FIG. 13 against the bias of spring 427. The function of spring 427 is to normally maintain the action pawl 17 and its program pawl 42 in the position of FIG. 12 were pawl 42 will engage program ratchet 41 in response to operation of the vehicle inertia sensor indicated generally at 30 in the embodiment of FIGS. 1 through 4. On the programmed engagement of action pawl 17 with the upper spool ratchet wheels 13 and 14, the action pawl 17 will be driven by upper spool rotation in a horizontal translatory movement from the position of FIG. 12 to that of FIG. 13, in the present embodiment, to operate the resilient connection means indicated generally at 480 and thereby cause lockup of reaction pawl 470 with lower spool 12.

In the present embodiment, the reaction pawl 470 is mounted by its outer ends in cut-out apertures in the side walls of the retractor frame, as illustrated by the wedge shaped cut-out 425 in side wall 424 in FIG. 12. The resilient connection means indicated generally at 480, in the present embodiment, comprises a right angle leaf spring 481 having an upper end 482 secured by spot welding or the like to action pawl 17, a central portion 483 mounted about pin 484 secured to the retractor side wall 424 and a lower arm 483', at generally right angles to the upper arm portion 485 to underlie pawl 470. The free end of lower arm 483' is provided with a pawl abutment portion 486 as illustrated in FIG. 12. As can be seen from the foregoing, movement of action pawl 17 from the position of FIG. 12 to the spool locking position of FIG. 13 will cause upper arm portion 485 of spring 481 to move to the right and urge via a lower arm 483' and its abutment 486 the reaction pawl 470 into engagement with ratchet wheels of lower spool 12 in a continuing manner which will overcome any tendencies for false or delayed lockup of pawl 470 with spool 12.

FIFTH ALTERNATIVE EXEMPLARY EMBODIMENT

Figures 14, 15:
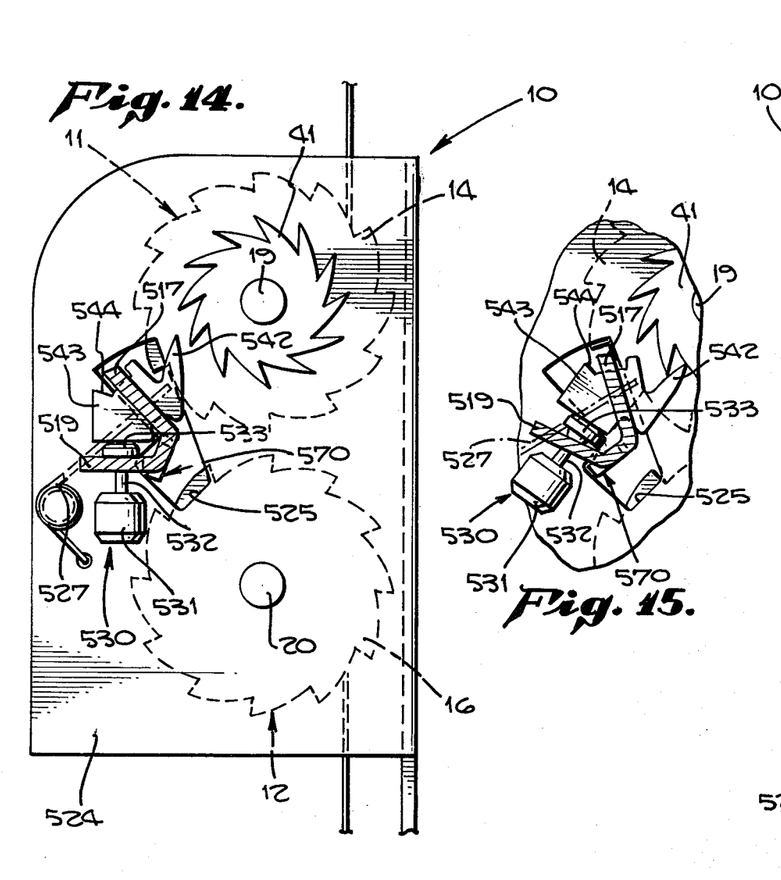
FIG. 14 is a view as in FIG. 3 showing a fifth alternative exemplary embodiment of emergency locking means for a dual spool safety belt retractor in accordance with the present invention.
FIG. 15 is a detailed view of the emergency locking means of FIG. 14 showing the same in engagement with a first spool.
Figure 16:
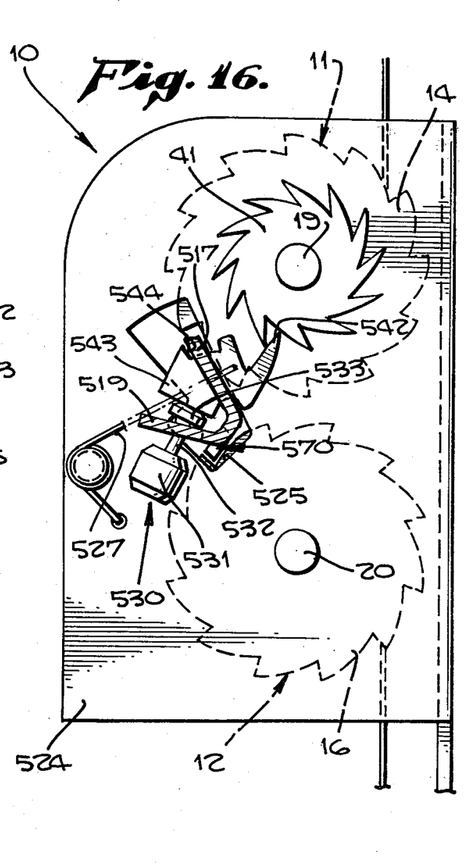
FIG. 16 is a view as in FIG. 14 showing the emergency locking means in engagement with both spools of the retractor.

A fifth alternative exemplary embodiment of emergency locking means in accordance with the present invention is illustrated in FIGS. 14 through 16. Reference numerals employed in these figures which are same as those employed hereinbefore indicate the same parts here as before. In this embodiment, as before, a program ratchet 41 is provided on spool shaft 19 for the upper spool 11 with the lower spool, indicated generally 12, being mounted about shaft 20, shafts 19 and 20 being rotatably mounted in the retractor frame. As particularly contemplated within the present invention, and as illustrated in the present embodiment, the action pawl 517 is provided with a program pawl 542 adapted to engage with the program ratchet 41 on tilting movement of pawl 517 imparted by operation of the vehicle inertia sensor indicated generally at 530. In this embodiment, sensor 530 includes a mass 531 suspended by stem 532 from head 533 seated upon a normally horizontal end portion 519 of the action pawl, stem 532 passing through an appropriate aperture provided through pawl portion 519. Head 533 underlies a body portion 543 of the program pawl which has a limited turning movement, by virtue of cut-out 525, relative to the apertured pawl 517 on which it is mounted. Initial pivoting movement of the sensor 530, as seen in FIG. 15, causing initial pivoting movement of program pawl 542, as also seen in FIG. 15, relative pawl 517 with the program pawl engaging program ratchet 41 and being carried to the position of FIG. 16 thereby. As seen in FIG. 16, when the program pawl 542 pivots in its slot through pawl 517 within the limits of cut-out 544, it carries pawl 517 into engagement with ratchet wheels 13 and 14 of upper spool 11. Continued spool movement in response to loading on the associated safety belt will drive pawl 517 toward the lower spool 12 forcing reaction pawl portion 570 into engagement with ratchet wheels 15 and 16 of the lower spool. The action pawl 517 and its reaction pawl portion 570 are normally biased by spring 527 into the position of FIG. 14, with end tabs of the pawl member 517 sliding in cut-outs provided in the retractor side walls, as cut-out 525 in side wall 524 in FIG. 14. As can be seen from a comparison of FIG. 14 and FIG. 15, when action pawl 517 engages ratchet wheels 13 and 14 of the upper spool, continued spool rotation drives the action pawl 517 along the side wall cut-outs, as cut-out 525, overcoming the bias of spring 527 to bring reaction pawl portion 570 into engagement with teeth of the lower spool 12.

SIXTH ALTERNATIVE EXEMPLARY EMBODIMENT

A sixth alternative exemplary embodiment of dual locking pawl emergency locking means in accordance with the present invention is illustrated in FIGS. 17 through 19. To the extent that similar retractor and locking means parts are employed in this embodiment as before, they are given the same reference numerals as before. In this embodiment, a vehicle inertia sensor, indicated generally at 630, is mounted to the retractor side wall 624 by mounting arms 635 extending outwardly from flange 636 secured by riveting or other suitable fastening means to the retractor side wall. The sensor includes a mass 631 suspended by stem 632 from head 633 which seats upon the support arm 635, stem 632 passing through a suitable aperture through support arm 635.

In this embodiment, the action pawl 617 and reaction pawl 618 are assembled in nested engaging relation as seen in FIGS. 18 and 19. Action pawl 617 has an extension 644, as seen in FIG. 17, which overlies the head 633 of the sensor. Movement of mass 631 in response to changes in vehicle inertia of more than a predetermined amount moves action pawl 617 from the position of FIGS. 17 and 18 to an upper spool engaging position, the upper spool then driving action pawl 617 to the position of FIG. 19 wherein it has forced reaction pawl 618 into engagement with ratchet wheels of the lower spool.

As best seen in FIG. 19, the left hand side wall 623 of the retractor frame in FIG. 17 is provided with a cut-out 626 to facilitate insertion of the nested pawls 617 and 618 into the space between the retractor side walls and the respective spools 11 and 12 as seen in FIG. 17. The right hand retractor side wall 624 is provided with a cut-out 625 accommodating end portions of the respective pawl 617 and 618 in load bearing relation. Action pawl 617 has end bearings 691 and 692 which seat or nest in curved support portions 693 and 694 provided in the reaction pawl 618. Reaction pawl 618 pivots about the upper edges of bearing 691 and 692 where they fit in the retractor side wall cut-outs 625 and 626. There is thus provided a separate action pawl for the first spool operated by a single vehicle inertia sensor which in turn operates a separate reaction pawl to lock the second spool in response to locking action of the first action pawl relative to the first spool.

Having thus described a preferred exemplary embodiment of dual locking pawl emergency locking means for a dual spool safety belt retractor in accordance with the present invention, and six alternative exemplary embodiments thereof, it should be apparent to those skilled in the art that a variety of modifications, adaptations and equivalent constructions can be made within the scope and spirit of the present invention in emergency locking means which is defined by the following claims.

We claim:

1. An improved dual locking pawl emergency locking means for a dual spool safety belt retractor having first and second belt storage spools, said spools having first and second ratchet means respectively for preventing spool rotation when engaged by the locking means comprising the provision of:
    an action pawl means for engaging only said first ratchet means of said first spool;
    inertia sensing means for moving said action pawl means into engagement with said first ratchet wheel in response to changes in vehicle inertia of more than a predetermined amount;
    reaction pawl means separate from said action pawl means and so provided as to react in response to movement of said action pawl means to engage said second ratchet wheel of said second spool in response to spool locking action of said action pawl means; and
    connecting means interposed between said action pawl means and said reaction pawl means for urging said reaction pawl means into engagement with said second ratchet wheel whereby spool locking movement of said action pawl means urges said reaction pawl means into locking engagement with said second ratchet wheel.

2. An improved dual locking pawl emergency locking means for a dual spool safety belt retractor having first and second belt storage spools, said spools having first and second ratchet means respectively for preventing spool rotation when engaged by the locking means comprising the provision of:
    an action pawl means for engaging only said first ratchet means of said first spool;
    inertia sensing means for moving said action pawl means into engagement with said first ratchet wheel in response to changes in vehicle inertia of more than a predetermined amount;
    reaction pawl means separate from said action pawl means and so provided as to react in response to movement of said action pawl means to engage said second ratchet wheel of said second spool in response to spool locking action of said action pawl means; and
    resilient connecting means interposed between said action pawl means and said reaction pawl means for resiliently urging said reaction pawl means into engagement with said second ratchet wheel whereby spool locking movement of said action pawl means resiliently urges said reaction pawl means into locking engagement with said second ratchet wheel in a continuing manner capable of overcoming a false locking condition between said reaction pawl and said second ratchet wheel.

3. The emergency locking means of claims 1 or 2 further comprising:
pawl programming means including a program ratchet on said first spool and a program pawl connected to said action pawl means whereby engagement of said program pawl with said program ratchet causes movement of said action pawl in response to rotation of said first spool into engagement with said first ratchet wheel in a predetermined manner to prevent further rotation of said first spool thereafter.

4. The emergency locking means of claim 2 wherein said resilient connecting means comprises a flexible linkage between said action and reaction pawl means.

5. The emergency locking means of claim 2 wherein said resilient connecting means comprises a body of resilient energy storing rubber like material.

6. The emergency locking means of claim 2 wherein said resilient connecting means comprises one or more bodies of resilient energy storing rubber like material located between and molded about adjacent pawl ends of said respective pawl means.

7. The emergency locking means of claim 2 wherein said resilient connecting means comprises a resilient energy storing spring connected to said action pawl means and biasing said reaction pawl means in response to movement of said action pawl means.

8. The emergency locking means of claim 2 wherein said resilient connecting means comprises a resilient energy storing leaf spring connected to said action pawl means and biasing said reaction pawl means in response to movement of said action pawl means.

9. The emergency locking means of claim 2 wherein said resilient connecting means comprises a resilient energy storing right angle leaf spring connected to said action pawl means and biasing said reaction pawl means in response to movement of said action pawl means.

10. The emergency locking means of claim 2 wherein said resilient connecting means comprises a resilient energy storing coil spring connected to said action pawl means and biasing said reaction pawl means in response to movement of said action pawl means.

11. An improved dual locking pawl emergency locking means for a dual spool safety belt retractor having first and second belt storage spools, said spools having first and second ratchet means respectively for preventing spool rotation when engaged by the locking means comprising the provision of:
an action pawl means for engaging only said first ratchet means of said first spool;
inertia sensing means for moving said action pawl means into engagement with said first ratchet wheel in response to changes in vehicle inertia of more than a predetermined amount; and
reaction pawl means separate from said action pawl means and so provided as to react in response to movement of said action pawl means to engage said second ratchet wheel of said second spool in response to spool locking action of said action pawl means, wherein said action pawl means and said reaction pawl means are provided in engaging nested relation whereby first ratchet wheel rotation when engaging said action pawl means drives said action pawl means against said reaction pawl means to move the latter into engagement with said second ratchet wheel.

12. A programmed action and reaction pawl emergency locking means for an automatic locking safety belt retractor having first and second belt storage spools, each spool having at least one locking ratchet wheel means for preventing spool rotation when engaged by an associated pawl, said locking means comprising:
an action pawl means for engaging a first locking ratchet wheel associated with the first spool to prevent rotation thereof;
pawl programming means including a program ratchet on said first spool and a program pawl associated with said action pawl means whereby engagement of said program pawl with said program ratchet when said spool is rotating causes movement of said program pawl which causes movement of said action pawl into engagement with said first locking ratchet wheel in a predetermined manner to prevent further spool rotation;
vehicle inertia sensing means for moving said program pawl into engagement with said program ratchet in response to vehicle acceleration or deceleration of more than a predetermined amount;
a reaction pawl means for engaging a second locking ratchet wheel associated with the second spool; and
connecting means connected between said action pawl means and said reaction pawl means and responsive to said movement of said program pawl in response to spool rotation for moving said reaction pawl into engagement with said second locking ratchet wheel associated with said second spool in reaction to engagement of said program pawl with said first ratchet wheel.

13. A programmed action and reaction pawl emergency locking means for an automatic locking safety belt retractor having first and second belt storage spools, each spool having at least one locking ratchet wheel means for preventing spool rotation when engaged by an associated pawl, said locking means comprising:
an action pawl means for engaging a first locking ratchet wheel associated with the first spool to prevent rotation thereof;
pawl programming means including a program ratchet on said first spool and a program pawl associated with said action pawl means whereby engagement of said program pawl with said program ratchet when said spool is rotating causes movement of said program pawl which causes movement of said action pawl into engagement with said first locking ratchet wheel in a predetermined manner to prevent further spool rotation;
vehicle inertia sensing means for moving said program pawl into engagement with said program ratchet in response to vehicle acceleration or deceleration of more than a predetermined amount;
a reaction pawl means for engaging a second locking ratchet wheel associated with the second spool;
a second program ratchet on said second spool and a second program pawl which is connected to said reaction pawl; and
resilient connection means for resiliently connecting said second program pawl to said first program pawl whereby said reaction pawl is moved into a programmed engagement with said second locking ratchet wheel by movement of said second program pawl responsive to rotation of said second spool when said second program pawl is engaged with said second ratchet wheel in reaction to engagement of said first program pawl with said first ratchet wheel.

14. The emergency locking means of claim 13 wherein said connection means comprises a linkage including a flexible link between said program pawls.

15. A programmed action and reaction pawl emergency locking means for an automatic locking safety belt retractor having first and second belt storage spools, each spool having at least one locking ratchet wheel means for preventing spool rotation when engaged by an associated pawl, said locking means comprising:

an action pawl means for engaging a first locking ratchet wheel associated with the first spool to prevent rotation thereof;

pawl programming means including a program ratchet on said first spool and a program pawl associated with said action pawl means whereby engagement of said program pawl with said program ratchet when said spool is rotating causes movement of said program pawl which causes movement of said action pawl into engagement with said first locking ratchet wheel in a predetermined manner to prevent further spool rotation;

vehicle inertia sensing means for moving said program pawl into engagement with said program ratchet in response to vehicle acceleration or deceleration of more than a predetermined amount;

a reaction pawl means for engaging a second locking ratchet wheel associated with the second spool;

means for providing a resilient connection between said action pawl means and said reaction pawl means whereby spool locking movement of said action pawl means when engaging said first ratchet wheel resiliently urges said reaction pawl means into locking engagement with said second ratchet wheel in a continuing manner capable of overcoming a false locking condition in the event said reaction pawl means were to initially engage a tip of a tooth of said second ratchet wheel.

* * * * *